United States Patent
Hannuksela et al.

(10) Patent No.: US 7,584,495 B2
(45) Date of Patent: Sep. 1, 2009

(54) REDUNDANT STREAM ALIGNMENT IN IP DATACASTING OVER DVB-H

(75) Inventors: Miska Hannuksela, Ruutana (FI); Roope Jarvinen, Ylojarvi (FI); Imed Bouazizi, Tampere (FI)

(73) Assignee: Nokia Corporation, Espoo (FI)

( * ) Notice: Subject to any disclaimer, the term of this patent is extended or adjusted under 35 U.S.C. 154(b) by 345 days.

(21) Appl. No.: 11/427,963

(22) Filed: Jun. 30, 2006

(65) Prior Publication Data
US 2008/0022340 A1    Jan. 24, 2008

(51) Int. Cl.
*H04N 7/173*  (2006.01)
*H04B 7/14*   (2006.01)
*H04B 1/60*   (2006.01)
*H04B 7/185*  (2006.01)

(52) U.S. Cl. .................. 725/101; 725/81; 725/90; 725/112; 725/113; 455/18; 455/10; 455/12.1

(58) Field of Classification Search ............ 725/81, 725/90, 101, 112–113; 455/10, 15, 18, 12.1
See application file for complete search history.

(56) References Cited

U.S. PATENT DOCUMENTS 6,535,717 B1 * 3/2003 Matsushima et al. ......... 455/18
7,072,291 B1 * 7/2006 Jagadeesan et al. ......... 370/216
2004/0218669 A1 * 11/2004 Hannuksela ........... 375/240.01
2005/0259690 A1 * 11/2005 Garudadri et al. .......... 370/477

OTHER PUBLICATIONS

ETSI EN 302 304 V1.1.1 (Nov. 2004) Digital Video Broadcasting (DVB); Transmission System for Handheld Terminals (DVB-H).*
Ye Wang, et al., "Content-Based UEP: A new Scheme for Packet Loss Recovery in Music Streaming", MM'03, Nov. 2-8, 2003, pp. 412-421.
Vinod Kumar Malamal Vadakital, et al., "Method for Unequal Error Protection in DVB-H for Mobile Television", The 17th Annual IEEE International Symposium on Personal, Indoor and Mobile Radio communications (PIMRC'06), 6 pages.

* cited by examiner

*Primary Examiner*—Hunter B. Lonsberry
*Assistant Examiner*—Gigi L Dubasky
(74) *Attorney, Agent, or Firm*—Banner & Witcoff, Ltd.

(57) ABSTRACT

A real-time program transmission system and method may receive a signal from a content source, and generate two different data streams. One stream may be of a higher quality than the other. The two streams may then be inserted into time slice frames, such that a single frame carries two portions of data: one corresponding to a first time segment in the program, and a second corresponding to a different time segment in the program. A receiving mobile terminal may buffer the received data, and may use the lower quality data as a backup in the event of a transmission error in the higher quality data.

25 Claims, 7 Drawing Sheets

US 7,584,495 B2

REDUNDANT STREAM ALIGNMENT IN IP DATACASTING OVER DVB-H

TECHNICAL FIELD

The present application is generally directed towards the transmission of digital data. More specifically, the application includes features relating to the preparation and transmission of redundant streams of real-time data in a time slice transmission system. Some aspects described herein relate to the timing relationship of related redundant data in time slice transmissions.

BACKGROUND

Mobile electronic devices are becoming more and more prevalent, with providers offering customers more and more features. Such features include the transmission of digital video data, such as video mail, movies, television shows, video games; the transmission of digital audio data, such as music, soundtracks for digital video, etc., and the like. A prior standard for the transmission of digital video data, known as DVB-T (established by the European Telecommunication Standards Institute, or ETSI), had been established for the general transmission of video data in a digital network, but that standard had its drawbacks when applied in a mobile device. In particular, the DVB-T standard placed a greater power drain on the mobile device, shortening its battery life.

The reason for this power drain lies in the multiplexing of the data in the DVB-T standard. In that standard, data for multiple different elementary services (ES) were closely multiplexed together, thereby requiring receiving mobile devices to have their receiving circuitry turned on continuously during use. This continuous use of the circuitry drained battery power.

To address this, the ETSI has since developed a new standard, known as DVB-H, that overcomes this drawback by using time slicing. The concept of time slicing is to send an elementary stream in bursts using significantly higher bitrate compared to the average bitrate of the elementary stream or the bitrate required if the elementary stream was transmitted using conventional bandwidth management of DVB-T. The burst is a set of sections containing parts of an elementary stream. Between the bursts, data of the elementary stream is not transmitted, allowing other elementary streams to use the bandwidth otherwise allocated. This enables the receiver to stay active for a fragment of the time, while receiving bursts of a requested service. As noted in section 9.2.3 of the European Standard ETSI EN 301 192, in an example, if the amount of data to be transmitted in a burst is 2 Mbits, and the total allocated bandwidth during a burst is 15 Mbps (over related transport packets), the maximum duration of the burst is 140 ms (from the beginning of the first transport packet, to the end of the last one). If the elementary stream carries one streaming service at constant bandwidth of 350 kbps, the average time between bursts is about 6.10 s.

The use of such time slices for the transmission of real-time data suffers from a problem that plagues all wireless transmission systems—the loss of data through signal interference or other network error. Various error correction and concealment schemes have been used to try and compensate for this lost data. For example, the DVB-H standard employs forward error control (FEC) methods, which seek to address the lost data by transmission of repair data calculated according to particular error correcting code schemes. However, existing methods are not perfect, and there is a need for improved methods of minimizing the effects of lost data.

BRIEF SUMMARY

This Summary is provided to introduce a selection of concepts in a simplified form that are further described below in the Detailed Description. This Summary is not intended to identify required features or essential features of the claimed subject matter.

A real-time data transmission method may allocate different portions, such as certain Multi-Protocol Encapsulation (MPE) sections, of a time slice frame for the transmission of one or more streams of real-time data corresponding, for example, to a multimedia program having audio and video content. One such portion may contain data corresponding to a first time segment of the program encoded with a first encoding method, primary encoded data, while a second portion may contain data corresponding to a second time segment of the program encoded with a second encoding method, secondary or redundant encoded data (the second time segment may be a different portion of the program from the first segment). The two encodings may be different from one another, such that one occupies less space, and may result in a lower quality reproduction of the program. The redundant encoding can in some embodiments be formed on the basis of the primary encoding. Examples of such are Reed-Solomon Forward Error Coding (RS-FEC) and Systematic Lossy Error Protection (SLEP), for example according to Wyner-Ziv encoding One of the encodings may be delayed (or buffered, such as being buffered in the encapsulator prior to being placed in the frame, or in the scheduling and delta-t module prior to being placed in the burst) prior to being placed in an MPE-FEC frame or burst for transmission so that bursts for the given program may contain two portions of data: a first portion corresponding to a first segment of the program and encoded in a first method, and a second portion corresponding to a time-offset segment of the program and encoded in a second method. These portions may be viewed as primary and redundant portions of the program's burst. The primary and redundant portions may correspond to different segments of the program that are separated by an amount of time (e.g., a burst's redundant portion may carry data for the second minute of a program, while its primary portion carries data for the first minute, leaving a one-minute time shift). A receiver may store both portions when receiving bursts, and may decode the primary portion for the user. When an error occurs in the primary portion, the receiver can revert to the stored redundant portion (e.g., in the example, it will have one minute of buffered redundant data from the previous burst to use) to continue uninterrupted playback of the program. Of course, the times used above are illustrative, and in implementation they may be different.

The real-time program may be a "live" program, such as a sports game in progress, or it may simply be a previously-recorded program being transmitted for consumption.

When used in the DVB-H time slice frame environment, the receiver may activate and deactivate the reception circuitry periodically to help conserve use of battery. This may be accomplished using the DVB-H delta-t method, in which a time duration between the start of a currently-received MPE or MPE-FEC section and the next burst is transmitted.

These and other aspects will be described in greater detail below.

BRIEF DESCRIPTION OF THE DRAWINGS

A more complete understanding of the features described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
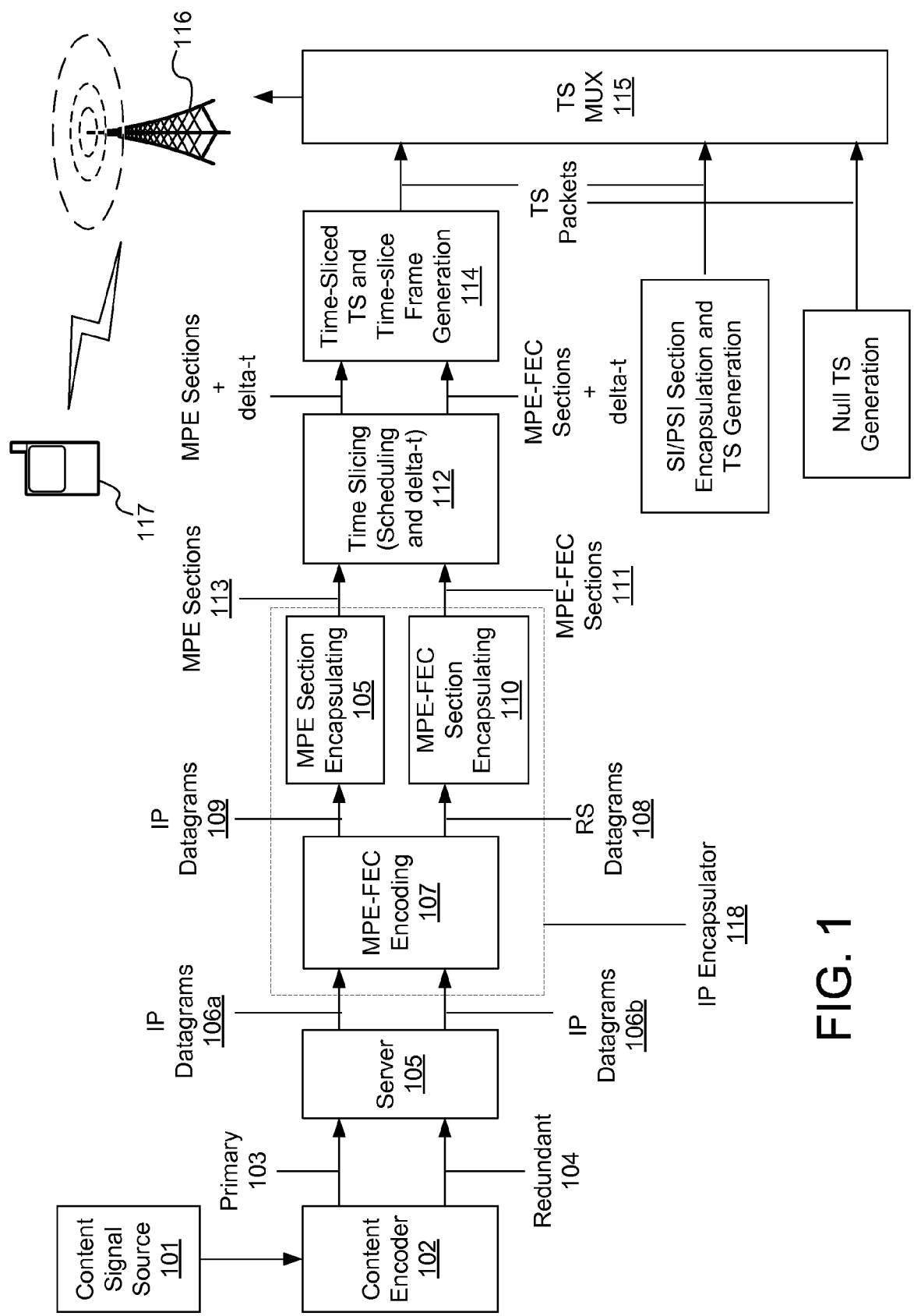
FIG. 1 illustrates a general block diagram of a transmission system in which various features described herein may be implemented.

FIG. 1 illustrates an example wireless transmission system in which features described herein may be implemented. A content signal source 101 may provide audio and/or video (or other data) signals to a content encoder 102, which encodes the signals to a bitstream using any desired encoding scheme. The content encoder 102 may generate two (or more) separate sets of encoded data for the content signal, where each set of encoded data can be decoded to recreate the original content signal (to the extent permitted by the encoding scheme used).

The encoded data, such as primary encoded data 103 and redundant encoded data 104, may be supplied to a server 105, which may be an IP multicast server. The server 105 may generate a corresponding stream (or streams) of IP datagrams/packets 106a, 106b corresponding to each of the primary and redundant encoded data 103, 104. This may involve, for example, forming RTP packets out of the encoded data, encapsulating them into UDP datagrams, and then further encapsulating them into IP datagrams. So, for example, the primary encoded data 103 may result in a set of one or more corresponding IP datagrams 106a, and the redundant encoded data 104 may also result in a set of one or more corresponding IP datagrams 106b.

The two IP datagram streams are supplied to an MPE-FEC Encoding block 107. For each stream, the block 107 writes the IP datagrams into an application data table of an MPE-FEC frame (described below), and calculates Reed-Solomon (RS) parity bytes for an RS data table of the MPE-FEC frame. The MPE-FEC frame is then forwarded on by the block 107. The IP datagram stream of the primary encoded stream may be buffered and time-shifted before being placed into the MPE-FEC frame.

For both encoded streams, the encoding block 107 may provide the calculated RS datagrams 108 to MPE-FEC Section Encapsulating 110, which forms MPE-FEC sections 111 and forwards them to Time Slicing 112. Similarly the encoding block 107 provides IP datagrams 109 to the MPE Section Encapsulating 105 that forms the MPE sections 113 and forwards them to Time Slicing 112.

The Time Slicing block 112 calculates delta-t information based on the amount of data needed to be transmitted and adds it to the section headers. The block 112 may also calculate CRC-32 error check data, and add it as trailers to the sections. These corresponding sections, with their delta-t data, are then forwarded to Time Sliced Transport Stream (TS) and Time Slice Frame Generation 114.

TS block 114 fragments the sections into the payload of MPEG-2 Transport Stream (TS) packet(s), and generates a header for each packet. A Time Slice Multiplexer 115 then multiplexes the data (with other data such as SI/PSI and possible DVB-T) into an output TS stream having a fixed data rate. If there is insufficient data, null TS packets are generated and included. The resulting stream is then transmitted by transmitter 116 to receiver 117, which decodes the received data to provide the content signal to the user.

Figure 2A:
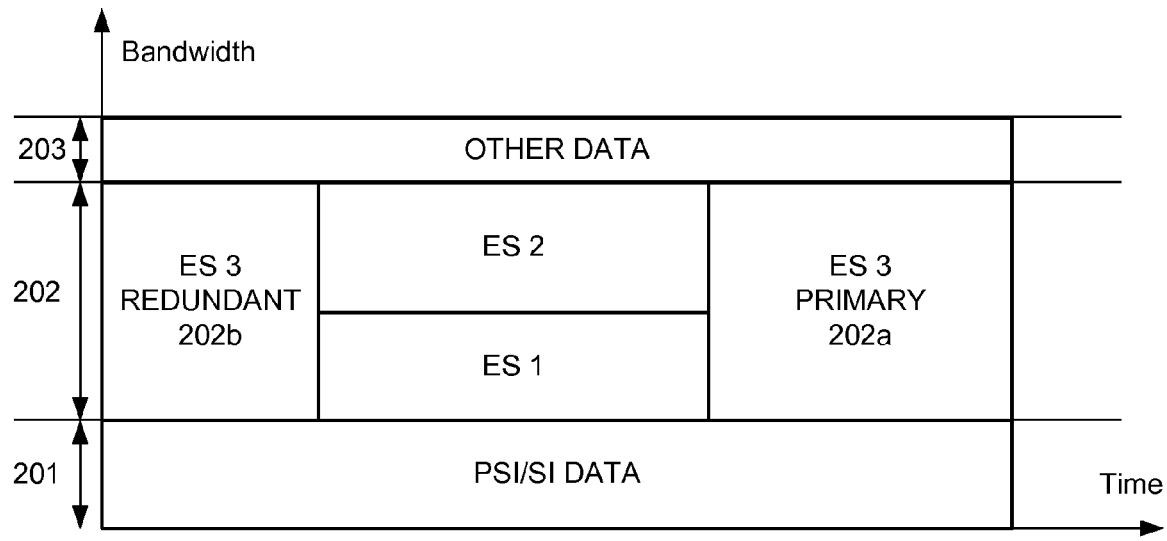
FIG. 2A illustrates an example time slice and associated allocation.

FIG. 2A illustrates an example of a bandwidth allocation of a transport stream that carries time-sliced and continuously transmitted data. In the DVB-H transmission scheme, elementary streams (carrying, for example, multimedia content) are transmitted in bursts periodically. The time slice frame can be divided into two or more slots in the time dimension. These slots may have the same or different durations. A slot can further be divided into subslots either 'vertically' (in bandwidth) or 'horizontally' (in time). When a particular service's assigned time arrives, the data for that service is transmitted as a burst, and receivers interested in that service will activate their receiver circuitry to capture that data. After the burst, a period of time (a delta-t value, which may be 1 second, 2 seconds, several seconds, etc.) is waited before sending another burst, and the receivers interested in that service may deactivate their receive circuitry until the delta-t period passes. The delta-t time value is included in each MPE and MPE-FEC section headers and hence the interval between consecutive time slices of an elementary stream may vary. When real-time transmission of data is occurring, each burst may be viewed as carrying a period's worth (e.g., delta-t's worth) of the real-time data. For example, a given burst (n) in a service having a period or delta-t of 6 seconds may carry 6 seconds of multimedia data for a service, while the next burst (n+1) may carry the next 6 seconds of multimedia data for that service.

The bandwidth allocation may include one portion 201 for PSI/SI information, or another type of overhead information associated with services carried in the transmission. These types of overhead information may be viewed as being transmitted continuously, and may be used as a "roadmap" through the data stream. PSI tables may be generated according to the MPEG format, and may include a Program Association Table (PAT—identifying services found in a transport stream); a Program Map Table (PMT—identifying elementary streams located within a given service); a Network Information Table (NIT—identifying information used for tuning to a particular stream); and a Conditional Access Table (CAT—identifying conditional access systems applicable to one or more portions of the transport stream). SI tables may be generated according to the DVB standards, and may include a Network Information Table; a Bouquet Association Table (BAT—information linking multiple services on different transport streams together to allow the user to treat the services as if they were all part of a single transport stream); Event Information Table (EIT—listing schedules of events being transmitted); and other types of data.

The transmission may also include a portion 202 reserved for real-time burst service, which contains the actual data, such as video information, digital audio, etc., for one or more elementary streams ES. An elementary stream in DVB-H is a stream of transport packets within a transport stream sharing a common Packet IDentifier (PID). The real-time burst portion 202 may be divided into a number of data slots for different ES's, and the delta-t value for the various slots indicates to the receivers the next time that data for that slot's ES will be available. The example of FIG. 2A includes slots for four elementary streams (ES1, ES2, ES3 Primary, ES3 Redundant) to send their bursts of data, although two of these services are illustrated as corresponding to the same service ES3, as will be explained below. For real-time services, the service's burst carries sufficient data to accommodate the time interval between the burst and the next burst for the service. So, for example, if each burst contains multimedia data for 6 seconds of playback duration, a particular service (e.g., ES1) can expect to receive data every 6 seconds. If the service is a music program, then the burst would carry enough coded data to recreate 6 seconds of the program's audio.

Figure 2B:
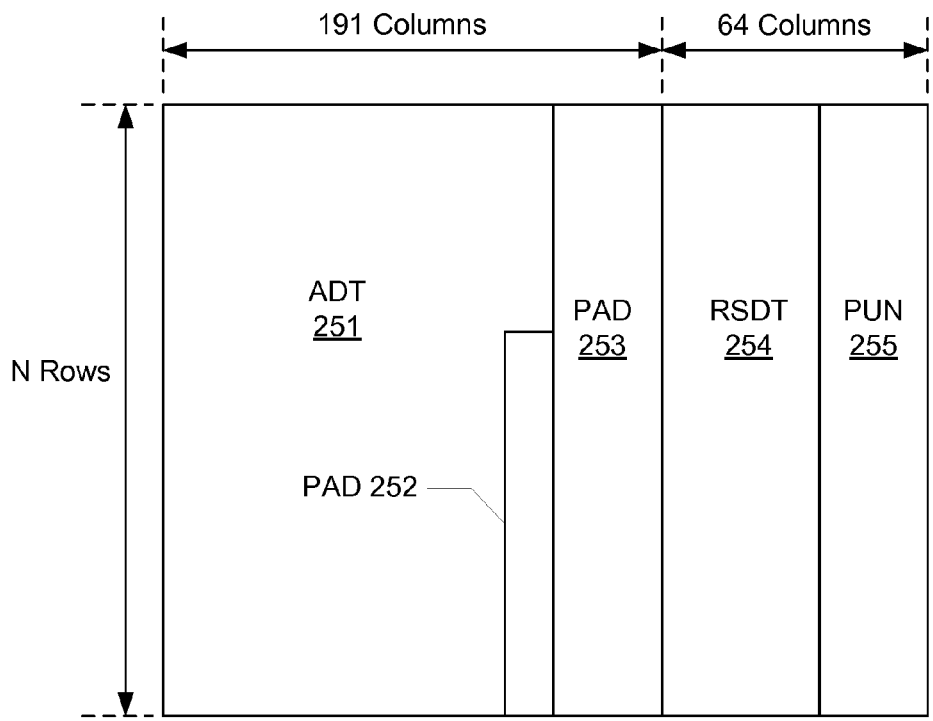
FIG. 2B illustrates an example Multi-Protocol Encapsulated, Forward Error Correction (MPE-FEC) frame that may be sent in an elementary service burst.

FIG. 2B illustrates an example of an MPE-FEC frame structure that may be used to carry the primary and redundant coded data for a given service. The frame structure may be arranged into a matrix of rows and columns of cells, with each cell containing one byte of the data (e.g., IP packets) being transmitted. The matrix may contain, for example, 255 columns, and a variable number of rows (N—e.g., 256, 512, 768, 1024, etc.). The frame may include an application data table portion (ADT 251) that may contain IP datagrams. The ADT 251 may be in one embodiment, as illustrated, 191 columns wide, and need not be completely filled with datagrams. Instead, the ADT 251 may include a padding portion (PAD 252, 253) of unused data (e.g., zero bytes) to control data rate and prevent IP packet fragmentation across multiple MPE-FEC frames. A second portion of the matrix may contain Reed-Solomon Data Table (RSDT 254), which may contain Reed-Solomon codes calculated for each row based on the row's contents. The codes need not occupy the entire space available in the RSDT 254 (which may be 64 columns wide), so the RSDT 254 portion may include non-transmitted columns, referred to as puncturing (PUN 255).

As mentioned above, the particular frame organization shown in FIG. 2A uses two slots in a time slice frame for the ES3 service, thereby transmitting two streams of data for the service. One slot (e.g., ES3 PRIMARY 202a) carries the primary encoded data for that service. So, for example, the data in the slot 202a carries sufficient data to recreate a corresponding portion of the service's program, such as 6 seconds worth of audio/video data. That same service is also assigned a second slot 202b. That second slot carries redundant data for the service, and may also be used to recreate an amount of content of the service, such as 6 seconds worth of audio/video (although, as will be explained below, the data in these two slots 202a, 202b do not necessarily correspond to the same 6 seconds portion of the program). The second slot 202b may be smaller than the first slot 202a, resulting in a savings of bandwidth but with lower-quality recreation of the content, and may be used as a backup when problems occur in receiving the primary encoded data in slot 202a. The bandwidth may also include a portion 203 reserved for the transmission of other data such as for example non-real time data.

In the example of FIG. 2A, the two slots 202a and 202b may not carry data for the same segment of the service's program, or its content. Instead, the data of the program segments transmitted in the slots may be offset by a time value.

Figure 2C:
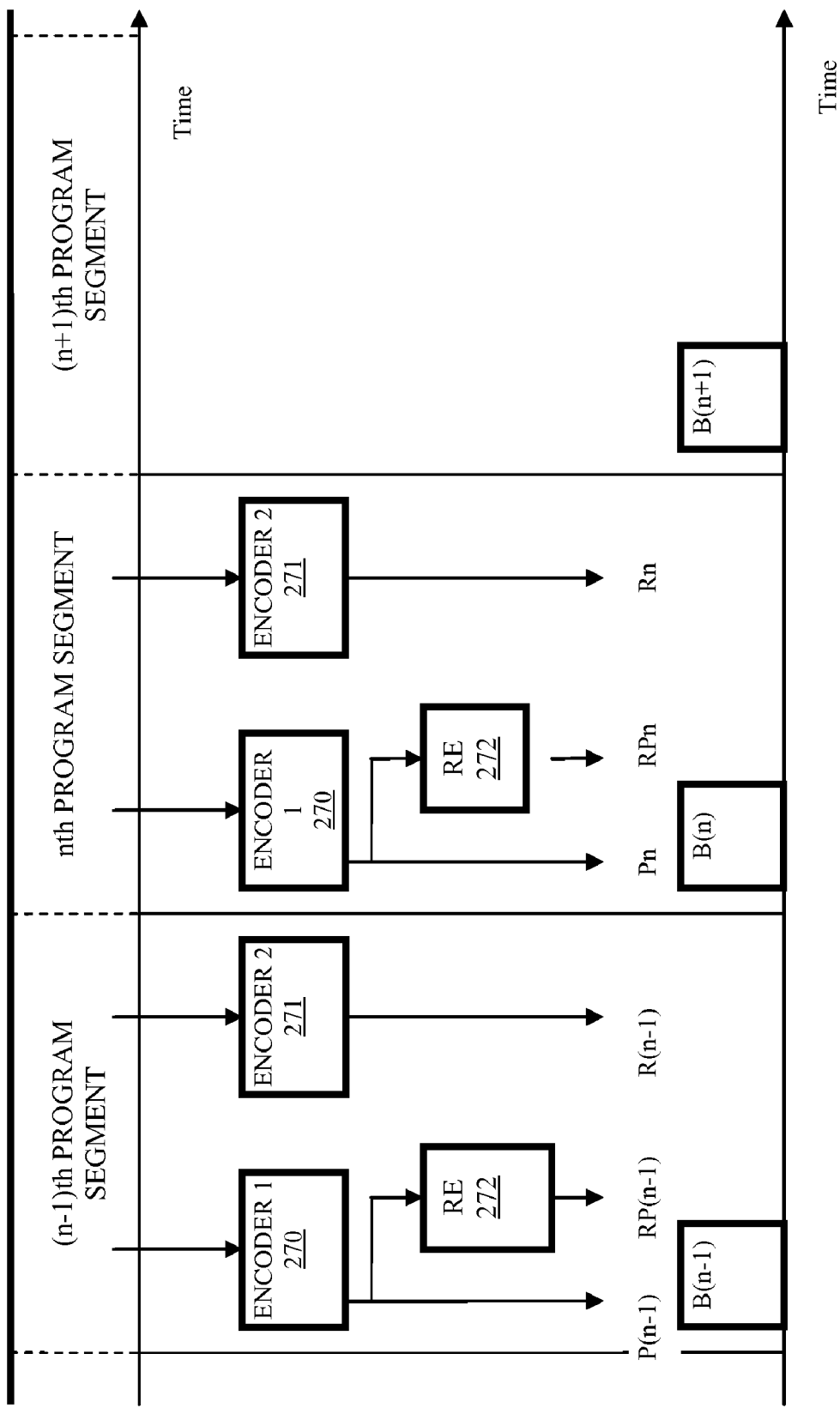
FIG. 2C illustrates an example timeline of a program's segments being encoded.

FIG. 2C illustrates an example timeline for transmitting encoded data. In the figure, a program being transmitted may be divided into sequential segments for transmission. Each segment may be encoded by a first encoder 270 (ENCODER 1) to produce a set of primary encoded data P(i) for the segment. Similarly, the program segment may also be encoded by a second encoder 271 (ENCODER 2) to produce a set of redundant encoded data R(i) for the segment.

The segment may, if desired, be encoded multiple times to generate multiple different sets of redundant data. For example, another set of redundant data RP(i) for the program segment may be generated by another encoder 272 (RE) using the output of the first encoder 270. The redundant data may be, for example, Reed-Solomon encoded Forward Error Correction (FEC) coded data, Systematic Lossy Error Protection (SLEP) data according to Wyner-Ziv encoding, or any other desired coded format. The various encoders may use different types of encoding, having different encoding parameters, different reproduction qualities, different compression rates, etc.

These primary and redundant encoded sets of data may be placed in bursts for transmission, such that redundant encoded data for a program segment is sent earlier in time than the primary encoded data for that segment. So, for example, a burst (n+1), B(n+1), may carry redundant encoded data R(n) for program segment 'n,' and primary encoded data P(n−1) for the previous program segment 'n−1.' Although the example shown in FIG. 2C shows a burst whose primary encoded data immediately follows the end of the program segment (e.g., burst 'n+1', B(n+1) carries primary encoded data for segment 'n'), there may be additional processing and/or propagation delay that separates the burst from the program segment, such that, for example, burst 'n+10' may carry primary encoded data for segment 'n−1' and redundant encoded data for the segment 'n.'

The example above also separates a program segment's primary and redundant data into different bursts, with the redundant one being sent in an earlier burst. As an alternative, a program segment's primary and redundant data may be carried in the same burst, with the redundant encoded data being sent in an earlier part of the burst than the primary encoded data. For example, burst 'n+1' may carry the redundant encoded data R(n) and the primary encoded data P(n) for the same segment 'n,' but may send the redundant encoded data R(n) in an earlier portion of the burst. Additionally, or alternatively, the redundant data from the other encoder 272 may be used as the redundant data, such that burst 'n+1', B(n+1) carries redundant encoded data RP(n) and primary encoded data P(n) for the same program segment 'n.'

Figure 3:
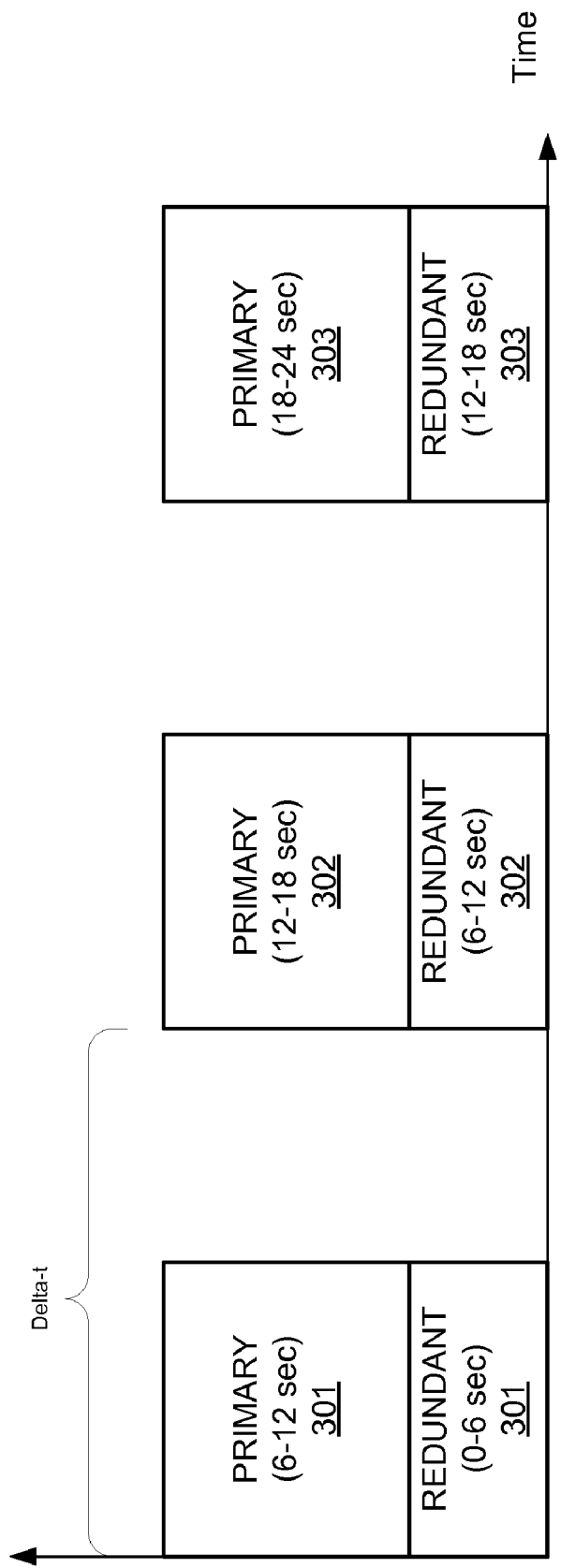
FIG. 3 illustrates an example sequence of bursts for a given elementary stream.

FIG. 3 is another timeline drawing illustrating the offset. In FIG. 3, three sequential bursts (or MPE-FEC frames for the service) 301, 302, 303 are illustrated, each carrying a primary and a redundant encoded data for a given real-time service. The first frame 301 carries redundant encoded data for a first time period of the service (e.g., the audio occurring in the first 6 seconds of the content), and primary encoded data for a next period of the service (e.g., the audio occurring in the next 6 seconds of the content). Similarly, the other frames 302, 303 each carry primary encoded data for a given time period (e.g., frame n), and redundant encoded data for a future offset time period (e.g., frame n+1). For example, the redundant portions may carry data for 2, 3, 4, 5, 10 frames in the future as compared to the current frame of data carried in the primary portion. By having this offset, a receiver stands a greater chance of being able to handle transmission failures, because data for any given portion of the content is transmitted in two distinct bursts, and errors are less likely to occur in both bursts.

Figure 4:
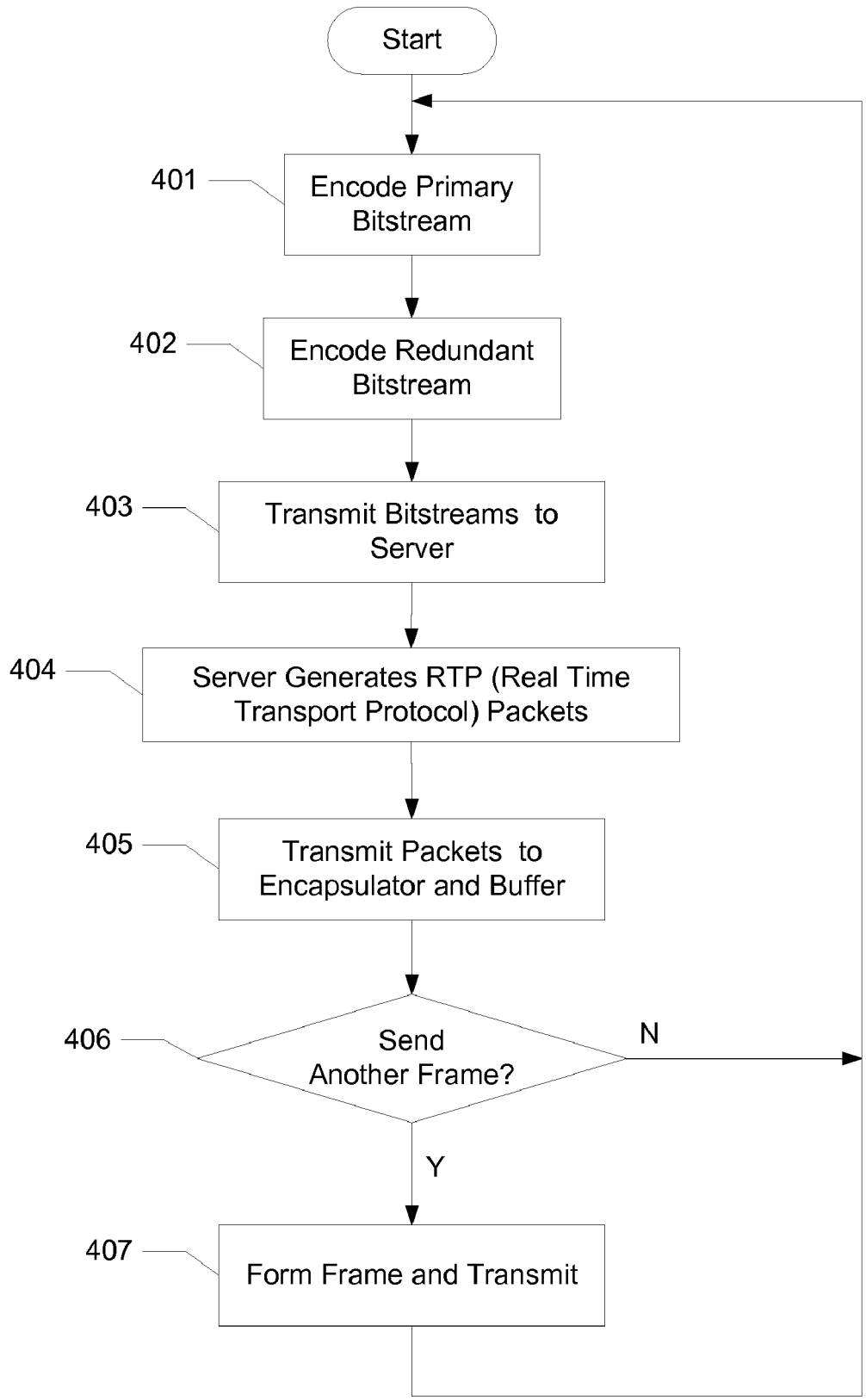
FIG. 4 illustrates an example method for transmitting data.

FIG. 4 illustrates an example method of generating the offset streams shown in FIGS. 2 and 3. As shown in step 401, a content encoder 102 may first encode a signal corresponding to audio and/or video content provided by a content source 101 into a primary encoded bitstream. The content source 101 may be any desired type of audio/video source, such as a feed from a live performance at a show, a broadcast television show, computer-generated video/audio data, stored audio/video data (e.g., video tape, compact disk, DVD, computer memory, etc.), and the like.

The primary encoded bitstream 103 encoded in step 401 may be of any type usable for the type of content involved. So, for example, if content source 101 provides audio and video signals for a television program, the primary encoded bitstream 103 may be encoded in MPEG-4 Advanced Audio Coding (AAC) or MPEG-4 Advanced Video Coding (AVC) format, or other desired format. The encoded bitstream may then be transmitted to a receiver, which may decode the encoded bitstream to reproduce the audio and video provided by the source 101.

In step 402, the content encoder 102 may generate a redundant encoded bitstream 104 for the signal provided by the content source 101. The redundant encoded bitstream 104 may be encoded differently from the primary stream 103, and may have a different sampling rate, compression type, quality, etc. The redundant encoded bitstream 104 may be a lower-quality version of the primary stream 103 (e.g., having a smaller sampling rate or resolution, fewer bits per pixel and/or second, a greater compression ratio, etc.) that requires less bandwidth to transmit, but may still be decoded to reproduce a lower quality version of the signal provided by the content source 101. Steps 401 and 402 are illustrated sequentially, but the content encoder 102 may operate to perform both steps simultaneously.

Then, in step 403, the coded bitstreams 103, 104 may be provided to a server 105, such as an IP multicast server, which may then prepare the streams for further transmission. The streams may be transmitted as an elementary self-contained bitstream format, a packet stream format, or they may be encapsulated into a container file for transmission. When both the bitstreams are encapsulated to the same file, data values may be added to the file to indicate that the streams are related to one another. For example, a file format derived from an ISO (International Standards Organization) base media file format (e.g., ISO/IEC 14496-12:2003) could be used, where each bitstream may be encapsulated into a track, and the value of the "alternate_group" field in the track header box for both bitstreams may be identical, indicating that the tracks are of the same origin and that only one should be played at a time. A new flag may also be specified in the track header box to identify the redundant coded bitstream 104.

When the bitstreams are transmitted using a transport protocol, such as a real-time transport protocol (RTP), their relationship may be indicated by data values contained in the associated signalling protocol. For example, if the streams are to be transmitted over RTP, specified in the RFC 3550 (http://www.ietf.org/rfc/rfc3550.txt?number=3550) of the Internet Engineering Task Force (IETF), and a real-time streaming protocol RTSP, specified in RFC 2326 (http://www.ietf.org/rfc/rfc2326.txt?number=2326, is used as the control protocol, the characteristics of the RTP streams may be announced using the session description protocol SDP (http://www.ietf.org/rfc/rfc2327.txt?number=2327). The server can use the SDP extension called "grouping of media lines" (RFC 3388—http://www.ietf.org/rfc/rfc3388.txt?number=3388) to associate two RTP streams together. A new group attribute value may be specified, similarly to lip synchronization (LS) and flow identification (FID) in section 4 of RFC 3388. The new attribute may be called "alternative encodings (AE)," and the first value after the AE identification tag in the 'a=group' line may indicate the primary coded stream, where the rest of the values indicate the redundant coded streams. An example of such an SDP description follows:

v=0
    o=Laura 289083124 289083124 IN IP4 one.example.com
    t=0 0
    c=IN IP4 224.2.17.12/127
    a=group:AE 1 2
    m=video 30000 RTP/AVP 98
    a=rtpmap:98 H264/90000
    a=fmtp:98 profile-level-id=42A01E; packetization-mode=0;
    sprop-parameter-sets=Z0IACpZTBYmI,aMljiA==
    a=mid:1
    m=video 30002 RTP/AVP 99
    a=rtpmap:99 H264/90000
    a=fmtp:99 profile-level-id=42A01E; packetization-mode=0;
    sprop-parameter-sets=Z0IACpZTBYmI,aMljiA==
    i=This media stream contains the redundant coded stream
    a=mid:2
    m=audio 30004 RTP/AVP 0
    a=mid:3

In step 404, the server 105 generates the data packets according to the real-time transport protocol (RTP) being used for transmission, and in step 405 those packets are transmitted to the IP encapsulator 118 (also known as a multi-protocol encapsulator—MPE). Some or all of these packets may also be buffered at the encapsulator 118 for processing—such buffer (not shown in FIG. 1) may be any type of electronic memory device, such as a RAM, FLASH RAM, disk drive, etc. The redundant stream may also be buffered, although the buffer is not shown in FIG. 1.

The IP encapsulator may packetize IP packets into Multi-Protocol Encapsulation (MPE) Sections, which are further encapsulated into MPEG-2 Transport Stream packets. The IP encapsulator may optionally use MPE-FEC error protection. The IP encapsulator creates data for the first and the second time-slice burst when data for the second MPE-FEC burst is completely received at the encoder. The very first burst may contain primary coded data and the redundant coded data (e.g. RS data) corresponding to the primary coded data carried in the second burst. Redundant coded data corresponding to the primary coded data of the very first burst for the multimedia program may be discarded. Primary coded data for the second burst may be stored. When redundant coded data to be carried in the nth (n>1) burst is completely received, the IP encapsulator creates a burst containing primary coded data and redundant coded data corresponding to the primary coded data to be carried in the (n+1)th burst. The primary coded data to be carried in the (n+1)th burst is stored until the redundant coded data for the next burst is received. Primary and redundant encodings may remain in their own RTP streams, but may form a bouquet such that they are encapsulated to the same MPE-FEC frames.

In step 406, the encapsulator 118 (or its specific MPE software and/or circuitry) may check to determine whether another frame of data should be sent (e.g., whether the timeslice period, or delta-t, has elapsed). The delta-t time value may have been transmitted in the previous burst. If it is not yet time for another burst, the process may simply return to step 401 to continue encoding and buffering data for the service. If another frame is to be sent, then the encapsulator 118 may assemble the appropriate bursts in step 407. As described above with respect to FIG. 3, the time slicing module 112 may use two slots for a given elementary stream, where one slot contains primary encoded data for a given time period (e.g., the present 6 seconds of an multimedia program), and another slot contains the redundant encoded data for another time period (e.g., the subsequent 6 seconds of an multimedia program). The time slicing module 112 may forward the data to a timeslice multiplexer 115 and further to a transmitter 116, which may use antenna (e.g., part of transmitter 116, not shown) to transmit the bursts at the appropriate times. The bursts may then be received by the receiver 117 and decoded. The decoding may involve buffering the redundant data stream and decoding the primary stream in real-time, and upon detecting an error in the primary stream, the receiver may use buffered data from the redundant stream to compensate for the missing primary data. The portion of the program decoded using the redundant data may be of lower quality, but it may still be enough to provide meaningful service to the user. The decoder may then continue to use the redundant stream until such time in the program that a "jump" can be made to return to using the primary stream (and at a time after the primary stream is once again successfully received and decoded).

The IP encapsulator 118 may packetize the IP multicast server's IP packets from streams 106a,106b into Multi-Protocol Encapsulation (MPE) Sections which are further encapsulated into MPEG-2 Transport Stream packets. The IP encapsulator 118 may optionally use additional forms of MPE-FEC error protection known in the art. At the receiving end, the buffered redundant stream data may be used if the additional forms of FEC fail to correct an error occurring in the reception of a given frame of data.

Figure 5:
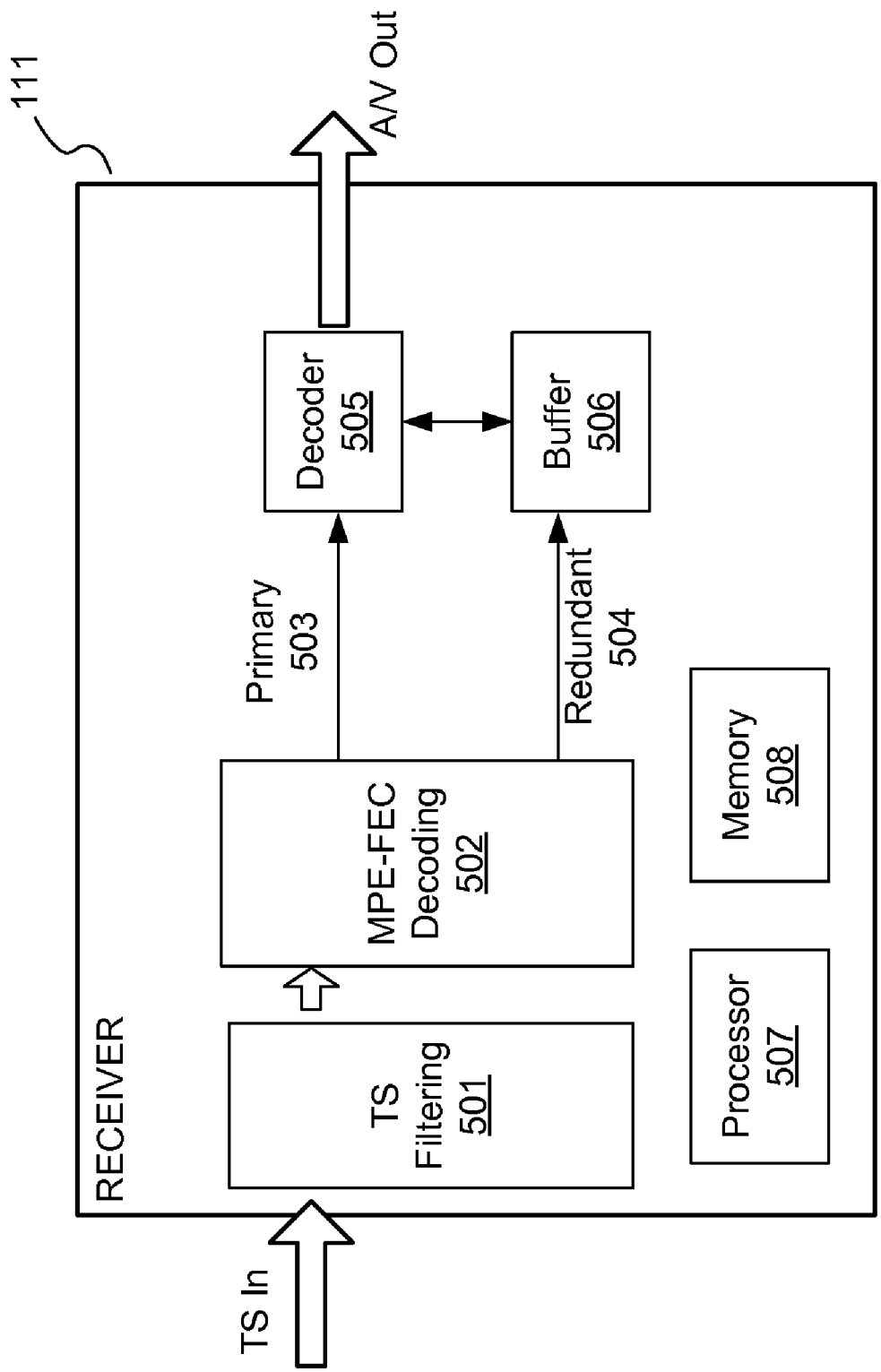
FIG. 5 illustrates a general block diagram of a receiver, or mobile terminal, that may be used to receive data transmitted according to the method shown in FIG. 4.

FIG. 5 illustrates basic components of a receiver or mobile terminal that may receive the transmitted signal originating from the antenna of the transmitter 116. As with all the figures herein, the various functional blocks may be software, firmware, hardware, or any combination configured to perform the functions. This functionality may be performed by a receiver/mobile terminal microprocessor, which may execute instructions for the functions that are stored in a computer-readable medium, such as one or more memories, disks, compact disks, etc. Although one particular design is provided, functional blocks provided here may be combined, rearranged, separated, or even skipped.

An incoming signal is received by receiver 117 as a transport stream (TS) when the receiver activates its receive circuitry. The TS filtering block 501 demultiplexes the various elementary streams contained in the received burst(s), which may be accomplished using identifier information (e.g., packet identifiers-PIDs) contained within the TS packets, and passes on only those TS packets belonging to the receiver's desired content or elementary stream(s). The stream contents are provided to the MPE/MPE-FEC decoding block 502, which reconstructs the MPE-FEC frames from the TS packets, and which may then de-encapsulate the frames to extract the underlying service payload data frames. If forward error correction was applied during transmission, this error correction may be applied as well to correct transmission errors.

The MPE/MPE-FEC decoding block 502 may identify the primary and redundant streams 503,504. The primary stream 503 may be forwarded to a decoder 505, where the data may be buffered and/or decoded to recreate the program content. The redundant stream 504 may be supplied to a buffer 506, where it may be stored until after the next frame arrives (containing the primary data for the same portion of the program). Although the example shown in FIG. 3 separates primary and redundant encoded data by one delta-t (e.g., one burst's primary encoded data covers the same segment of the program as the previous burst's redundant encoded data), other time intervals between the primary encoded data and its corresponding redundant encoded data may be used. For example, redundant encoded data may be sent 2, 3, 4 or more bursts in advance of the corresponding primary encoded data or even several times. Receivers store the redundant encoded portions in a buffer, and embodiments using a longer separation interval will result in receivers having more buffered data to use in the event of a failure in receiving a burst's primary encoded data.

Decoder 505 is used to decode the primary stream to recreate the program content. In response to a corruption of a piece of data in the primary stream, the corresponding piece of data in the redundant stream is decoded. If a piece of data in the primary stream can be replaced with the corresponding piece in the redundant stream and decoded with the same decoding process as the primary stream, the streams are mutually exchangeable. Otherwise, a different decoding process may be required or the decoder has to be re-initialized when switching from decoding of the primary stream to the decoding of the redundant stream. In one embodiment the decoder 505 may run two separate decoding processes, one for the primary stream and another one for the redundant stream. As it is beneficial for the receiver to know whether the streams are mutually exchangeable, the file format and signaling format (e.g. SDP) may include indications related to mutual exchangeability.

The various operations of the receiver may be performed under the control of a processor 507, which may be implemented as one or more discrete logic components or programmable devices. A memory 508, which may be implemented using one or more electronic storage devices, may store scheduling information for activating and deactivating reception circuitry, and executable instructions for causing the receiver components to perform the various features described herein.

In one embodiment, not illustrated in FIG. 5, a receiver or a mobile terminal includes two decoders instead of decoder 505. One of the decoders is for the primary encoded stream and the other one is for the redundant encoded stream. The output of the decoders is controlled in such a way that only one of the decoders at a time outputs. If the decoding result of the primary encoded stream is correct, then it should be output. If it is incorrect, and if the decoding result of the redundant encoded stream is correct, then the decoded redundant stream should be output. Otherwise, the decoding result of both streams should be analyzed and the one giving better result subjectively should be output. For example, the stream using the higher degree of error protection/detection/correction may be chosen as the default. Alternatively, so-called error tracking can be used to determine how big a picture area is corrupted, and the stream in which a smaller area is corrupted is output. Alternatively, any so-called no-reference video quality analysis method can be used to determine which one of the streams is of better quality.

Figure 6:
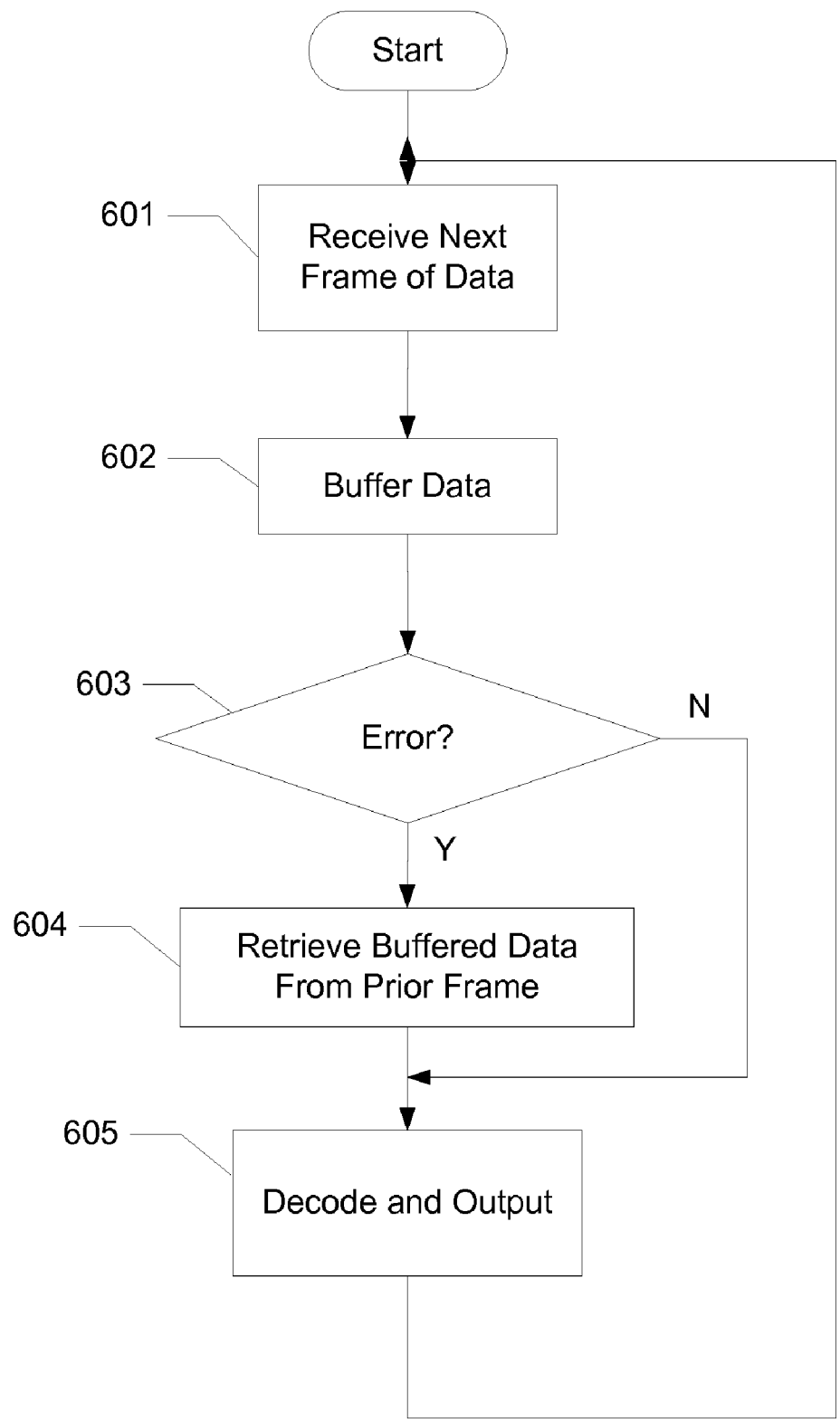
FIG. 6 illustrates a method for receiving data.

FIG. 6 illustrates an example process in which the streams may be used. At step 601, the next frame of data is received, and the frame's data for the two streams may be extracted. In step 602, the data from the redundant encoded stream may be buffered for future use. In step 603, the data from the primary encoded stream may be examined to determine whether irreparable transmission errors have occurred. This may be accomplished using the FEC technique applied at the transmitter, and may also involve other types of error detection and correction. If the receiver determines that errors have occurred with the current frame of the primary stream data, the receiver may, in step 604, retrieve the buffered data from the previously received frame carrying redundant encoded stream corresponding to the recently received primary encoded stream data, since that earlier frame's redundant encoded stream would have carried data that can be used to recreate the same portion of the program. In step 605, the decoder 505 works to decode the current frame of data (either the primary encoded frame most recently received, or the buffered data that was received in an earlier frame) and generate an audio and/or video output for the program.

Associations between bursts may be identified in a variety of ways. As noted above, if the burst is encapsulated to a single file, that file may contain associating data. Alternatively, the bursts may be transmitted as a bouquet, with the bouqet allocation table (BAT) providing the linking data between them. As an additional feature, the Electronic Service Guide (ESG) specified in the DVB-H standard may be used to provide information to the receiver and/or user that one or more redundant stream(s) are available for a particular service. The user may, for example, view this information displayed on a mobile telephone, and use it to determine which service to request. Furthermore, the ESG may provide the necessary information for the receiving terminal to connect to the related IP streams carrying the media streams of the selected service.

An example data model may be represented through an XML schema definition that can be used with all ESG instances. An ESG instance is composed of a set of ESG fragments and their relationships in conformance with the ESG data model, as defined in the DVB-H standard. See, e.g., IP Datacast over DVB-H: Electronic Service Guide; [DVB Document A099, November 2005; downloadable at http://www.dvb-h-online.org/PDF/a099.tm3348r2.cbms1199r14.IPDC_ESG.pdf. The ESG defines several fragments such as the service fragment, schedule fragment, purchase fragment, and acquisition fragment. The acquisition fragment provides the necessary information to locate and access the service. It also provides a description of the contents of the service in the component characteristic field. A snapshot of the syntax of the component characteristic element may appear as follows:

```
<complexType name="ComponentCharacteristicType" abstract="true">
    <sequence>
        <element name="Bandwidth"
        type="tva:BitRateType" minOccurs="0"/>
    </sequence>
    <attribute name="purpose" type="string" use="optional"/>
</complexType>
<complexType name="VideoComponentType">
    <complexContent>
        <extension base="esg:ComponentCharacteristicType">
            <sequence>
                <element name="CodecCharacteristic"
                type="esg:VideoCodecCharacteristicType"
                minOccurs="0"/>
                <element name="FrameRate" type="tva:FrameRateType"
                minOccurs="0"/>
                <element name="OpenCaptionLanguage" type="language"
                minOccurs="0"/>
                <element name="SignLanguage"
                type="tva:SignLanguageType" minOccurs="0"/>
            </sequence>
        </extension>
    </complexContent>
</complexType>
```

-continued

```
<complexType name="VideoCodecCharacteristicType">
    <sequence>
        <element name="Codec" type="tva:ControlledTermType"
        minOccurs="0"/>
        <element name="ProfileLevelIndication"
        type="tva:ControlledTermType"
        minOccurs="0"/>
    </sequence>
</complexType>
<complexType name="AudioComponentType">
    <complexContent>
        <extension base="esg:ComponentCharacteristicType">
            <sequence>
                <element name="Codec" type="tva:ControlledTermType"
                minOccurs="0"/>
                <element name="Mode" type="tva:ControlledTermType"
                minOccurs="0"/>
                <element name="Language"
                type="mpeg7:ExtendedLanguageType" minOccurs="0"
                maxOccurs="unbounded"/>
            </sequence>
        </extension>
    </complexContent>
</complexType>
```

The acquisition fragment of the ESG data may be an appropriate place to inform the receiving terminal about the existence of a redundant stream for a given program or service content. For each media component of the stream, the fragment may contain an indication of whether a corresponding redundant stream(s) exists, and the time shift duration or the necessary buffering capacity (=time-shift duration*bandwidth of allocated burst) for that redundant stream. The definition of an extended video component characteristic that supports a redundant stream can be as follows:

```
<complexType name="VideoExtComponentType">
    <complexContent>
        <extension base="esg:VideoComponentType">
            <sequence>
                <element name="RedundantStream"
                type="RedundantStreamType" minOccurs="0"/>
            </sequence>
        </extension>
    </complexContent>
</complexType>
<complexType name="RedundantStreamType">
    <attribute name="Count" type="unsignedInt" />
    <sequence>
        <element name="RSCharacteristic" type="RSCharacteristicType"
        minOccurs="0"/>
    </sequence>
</complexType>
<complexType name="RSCharacteristicType">
    <attribute name="BufferSize" type="unsignedInt" />
    <attribute name="TimeShift" type="duration" use="optional"/>
</complexType>
```

The syntax above allows for the definition of multiple redundant streams for a given primary stream of a specific program or service. For each of the redundant streams, the amount of time shift and the corresponding buffer size may be specified. This information may be used by the terminal to check for fulfilment of the capability requirements, and may also be used for synchronization purposes.

As a further alternative, there may be signalling between the IP encapsulator 118 and the server 105 to indicate the interval between bursts (delta-t), and the interval may remain unchanged throughout the transmission session (e.g., the duration of the content or program). The server 105 may transmit the redundant coded stream forward-time-shifted by the indicated delta-t amount (and the redundant coded frames for the primary coded frames in the very first MPE-FEC frame need not be transmitted). In case of live encoding and transmission, the server 105 may buffer redundant and primary coded data similarly to that described above in the encapsulator 118. In case of pre-encoded streams, the server 105 may simply access the streams 103,104 (or from content source 101) from different positions.

The example shown in FIG. 2A shows the different encodings being treated by the encapsulator 118 as different services having separate slots. As an alternative, and as shown in FIG. 3, the primary and redundant encodings may be treated as a single service, sharing the same burst. The multiplexing of the primary and redundant coded streams may happen in different layers of the protocol stack, such as in the RTP payload layer, or in the coding/decoding layer of the content encoder 102.

As a further alternative, burst location may be adjusted to help minimize likelihood of error. For example, the primary and redundant encoded data shown in FIG. 3 are depicted as occurring in parallel within the frame. As an alternative, these encoded data may be placed at opposite ends of the frame (e.g., one near the beginning of the frame, one near the end of the frame, placing one or more bursts between, etc.). In one embodiment the primary and redundant encoded data may be placed having one or more additional bursts for the same service in between (e.g., one burst for the service carries primary encoded data for a given segment of a program, and the corresponding redundant encoded data for that segment is carried in a burst occurring 2, 3, 4 or more bursts earlier and in some embodiments even in more than one burst).

In the examples described above the bursts carry data corresponding to two segments of the program (e.g., each burst carries primary encoded data for time segment (n), and redundant encoded data for time segment (n+1)). Doing so may allow the receiver to quickly access the redundant data upon discovering a transmission error in the most recently-received data, because the redundant encoded data for the current frame would have been received earlier. Accordingly, a given time slice frame may carry redundant data for a later time segment (e.g., the frame carries primary encoded data for time segment (n), and redundant encoded data for time segment (n+1)). As another embodiment, the burst may carry primary and redundant encoded data for the same time segment of the program, with the redundant encoded data carried in an earlier part of the burst (which may be useful, for example, if the primary and secondary encodings are affected differently by transmission error).

The processes described herein are conceptual in nature for ease of explanation, but need not be implemented in this same order described. Additionally, the various functions and process steps described above may be implemented by one or more processors, and stored on one or more computer-readable media in the form of computer-executable instructions. Similarly, the content encoder 102 and the server 105 may be implemented in the same physical device, or they may be included in separate devices. The content encoder 102 and server 105 may operate with live real-time content, in which case the coded media bitstreams are typically not stored permanently, but rather buffered for small periods of time in the content encoder 102 and/or in the server 105 to smooth out variations in processing delay, transfer delay, and coded media bitrate. The content encoder's operations need not occur concurrently with the server's operations, and the system may include a content database, which may reside in a separate device or in the same device than the content encoder or the server, to store the bitstreams until the server 105 is ready to process them.

Additionally, server 105 may be an IP Multicast server using real-time media transport over RTP. The server 105 may encapsulate the coded bitstreams into RTP packets according to an RTP payload format. Different media types may have different RTP payload formats, so bitstreams for primary and redundant coded data may vary with service. Although only one server 105 is shown in the FIG. 1 block diagram, the system may contain more than one server. The server 105 may announce the availability of media streams 106a,106b to the IP encapsulator 118 using SDP over RTSP, similarly to what is described above. To help match corresponding samples in the primary coded RTP stream carried in IP datagrams 106a with redundant coded RTP stream carried in IP datagrams 106b, the server 105 can initialize the RTP timestamp to an equal offset for both of the streams. In some situations, the server 105 creates no time-shift between the primary coded stream 106a and the redundant coded stream 106b. Alternatively, the server 105 may cause the time-shift, which may minimize the amount of buffering needed at the encapsulator 118.

The description above describes various types of forward error control. This forward error control may operate in a source coding layer, and may be codec- or media-aware, i.e. may require knowledge of coding, bitstream syntax, and decoding of the codec in use. Media-aware forward error control methods can be categorized to restricted prediction and redundant representation methods. A restricted prediction method is such that not all predictive coding methods are applied to code a piece of source data to limit or stop propagation of transmission errors. A result of applying a restricted prediction method is a valid coded bitstream in which the compression ratio is not as high as it would have been if all means of compression have had been used. For example, restricted prediction methods include the family of loss-aware intra macroblock insertion algorithms.

A redundant representation method is such that at least part of the coded bitstream is redundantly coded at least a second time. Examples of redundant representations include, redundant coded pictures (of H.264/AVC and H.263), picture header repetition (of H.263 Annex W and RFC 2429, i.e. the RTP payload format of H.263), header extension of MPEG-4 Visual, and the possibility of coding motion vectors for intra coded macroblocks of MPEG-2 Visual. If a redundant representation can be included to the same bitstream as primary coded samples, such redundant coding is herein referred to as in-band redundant coding. If the signaling of redundant coding requires external means, such redundant coding is herein referred to as out-of-band redundant coding.

Many features described above may be viewed as a redundant coded pictures technique. For example, for each normal coded video picture, there may be zero or more redundant coded pictures whose decoded contents are close to the normal decoded picture. A redundant coded picture is not necessarily a copy of the corresponding primary coded picture, but rather, for example, different reference pictures for motion compensation can be used. In the absence of a primary coded picture, a redundant coded picture can be decoded instead. The sample values of a redundant decoded picture are typically close to but not exactly the same as the corresponding sample values in the corresponding primary decoded picture. The SI/SP macroblock type of H.264/AVC makes it possible to achieve exactly the same sample values too. (e.g., SI switching-intra picture, SP switching-predictive picture).

Forward error control methods described herein may operate below the source coding layer, and may be codec- or media-unaware, i.e. the redundancy is such that it does not require parsing the syntax or decoding of the coded media. In such media-unaware forward error control, error correction codes, such as Reed-Solomon codes, are used to modify the source signal in the sender side such that the transmitted signal becomes robust, i.e. the receivers can recover the source signal even if some errors hit the transmitted signal. If the transmitted signal contains the source signal as such, the error correction code is systematic, and otherwise it is non-systematic.

Media-unaware forward error control methods are typically characterized by the following factors:
  k=number of elements (typically bytes or packets) in a block over which the code is calculated
  n=number of elements that are sent
  n−k is therefore the overhead that the error correcting code brings
  k'=required number of elements that needs to be received to reconstruct the source block provided that there are no transmission errors
  t=number of erased elements the code can recover (per block)

Media-unaware error control methods can also be applied in an adaptive way (which can also be media-aware) such that only a part of the source samples is processed with error correcting codes. For example, non-reference pictures of a video bitstream may not be protected, as any transmission error hitting a non-reference picture does not propagate to other pictures.

Redundant representations of a media-aware forward error control method and the n−k' elements that are not needed to reconstruct a source block (for example Reed-Solomon data) in a media-unaware forward error control method may be viewed as forward error control overhead.

The data units for forward error control overhead may be sent in advance compared to corresponding primary coding. The amount of time between the forward error control overhead and the corresponding primary coding can be selected according to a maximum expected error burst length, for example, such that 95% (or any other predetermined portion) of error bursts are shorter in duration.

Although a number of features and aspects are described above, additional modifications may also be made. In some aspects, the streaming system may be IP data casting over DVB-H. When the error recovery capability of MPE FEC is not enough to recover all erroneous data, no bits of the data block can be recovered. For DVB-H, this means that an entire MPE FEC frame gets lost if the MPE FEC is not capable of recovering all errors occurring in the frame. Due to time slicing, an MPE FEC frame may contain data for a long duration of time. Thus, a loss of an MPE FEC frame is very annoying for the end-user. Using features described above, such data loss may be avoided.

In some aspects, transmission of forward error control overhead may be arranged in such a way that at least some of the forward error control overhead is sent in a separate time slice burst compared to corresponding primary coding. When forward error control overhead is sent in a different IP multicast group compared to the primary representation, it is easy for the IP encapsulator to send forward error control overhead and primary coding in separate timeslice bursts. Alternatively, forward error control overhead may be transmitted in the same IP stream but in a different timeslicing burst compared to corresponding primary coded samples.

In some aspects, the redundant coded representation may include redundant coded slices of data according to H.264/AVC. When the RTP payload format of, or similar to, draft-ietf-avt-rtp-h264-10.txt is used, the interleaved packetization mode may be used (packetization-mode MIME parameter equal to 2).

In some aspects, the forward error control overhead contains symbols of a media-unaware error-corrective code that is sufficient to recover a block of source symbols. For example, an XOR code may be used.

In some aspects, the encoded program segment data may be carried in separate streams, and the time-shifting may be carried out in the server 105. There may be signalling between the IP encapsulator 118 and the server 105 to indicate the interval between time-slices (delta-t) and the interval remains unchanged or predictable throughout the session. The server 105 transmits the redundant coded stream forward-time-shifted by the indicated delta-t amount (and the redundant coded frames data for corresponding to the primary coded frames data in for the very first MPE-FEC frame are is not transmitted). In case of live encoding and transmission, the server 105 may buffer redundant and primary coded data. In case of pre-encoded streams, the server 105 may simply access the content from desired positions.

Alternatively, the primary and redundant encoding may be part of a single stream of data. In this alternative, the primary and redundant encodings are transmitted in the same logical stream. Multiplexing of the primary and redundant coded streams may happen in different layers of the protocol stack, such as in the RTP payload layer (similarly to the anti-shadow payload draft) or in the codec layer (similarly to the redundant coded pictures of the H.264/AVC. Time-Shifting for this option can happen either in the IP encapsulator 118 or in the server 105. If time-shifting happens in the IP encapsulator 118, it may have to parse the RTP packets (or even payloads) for buffering of the data.

The present application includes any novel feature or combination of features disclosed herein either explicitly or any generalization thereof. While the features have been described with respect to specific examples, those skilled in the art will appreciate that there are numerous variations and permutations of the above described systems and techniques. Thus, the spirit and scope of the application should be construed broadly as set forth in the appended claims.

We claim:

1. A method, comprising:
  receiving first and second sequential segments of a program for transmission, wherein said first segment occurs before said second segment in said program;
  encoding said first and second segments with a first encoder to form primary encoded data for said segments;
  encoding said first and second segments with a second encoder to form redundant encoded data for said segments, said second encoder applying a different encoding process than the first encoder;
  transmitting said primary encoded data of said second sequential segment and said redundant encoded data of said first sequential segment in a single time slice burst.

2. The method of claim 1, wherein said second encoder uses output from said first encoder to form said redundant encoded data for each of said segments.

3. The method of claim 1, wherein said second redundant encoded data occupies less bandwidth in said burst than said primary encoded data.

4. The method of claim 1, wherein said primary encoded data of said second segment and said redundant encoded data of said first segment are separated in time by additional data within said burst.

5. The method of claim 1, further comprising transmitting a second burst of data subsequent to said first burst, wherein said second burst comprises said redundant encoded data of said second segment, and a primary encoded data of a third segment occurring after said second segment in said program.

6. The method of claim 1, further comprising applying forward error correction in said transmitting.

7. The method of claim 1, further comprising allocating said first and second primary and redundant encoded data to logical streams at an RTP payload layer.

8. The method of claim 1, wherein said burst comprises a DVB-H time slice frame.

9. The method of claim 1, further comprising a step of allocating said first and second primary and redundant encoded data to logical streams at a codec layer.

10. A method, comprising:
receiving a first transmission burst, said first burst comprising:
primary encoded data for a second segment of a multimedia program encoded with a first encoder;
redundant encoded data for a first segment of the multimedia program encoded with a second encoder, and;
a first delta time value for a future transmission burst corresponding to said multimedia program, wherein said second segment is later in said program than said first segment, and said primary encoded data of said second segment and said redundant encoded data of said first segment are both in the first transmission burst.

11. The method of claim 10, further comprising:
buffering said primary encoded data for said second segment;
receiving a second burst containing redundant encoded data corresponding to the second segment of said program and a second delta time value;
determining whether transmission error occurred with said second burst; and
if an error occurred with said second burst, using said buffered redundant encoded data to provide said second segment of said program to a user.

12. The method of claim 11, further comprising:
storing said first delta time value;
activating, at a time according to said first delta time value, reception circuitry prior to receiving said second burst;
deactivating said reception circuitry after receiving said second burst; and
re-activating said reception circuitry for reception at a subsequent time based on said second delta time value.

13. The method of claim 10, wherein said burst comprises a DVB-H time slice frame.

14. The method of claim 10, further comprising a step of assigning said primary and redundant encoding data to a common logical stream.

15. The method of claim 10, wherein said primary and redundant encoding data are separated in time in said first transmission burst by additional data.

16. The method of claim 10, wherein said delta time value equals a duration of said first segment of said program.

17. An apparatus, comprising:
reception circuitry configured to receive transmission bursts;
a processor configured to activate said reception circuitry to receive a first burst having at least two portions of data, wherein a first portion contains primary encoded data corresponding to a second segment of a program being received, and a second portion contains redundant encoded data corresponding to a first segment of said program, said second segment being later in said program than said first segment, and wherein said primary and redundant encoded data are encoded differently from one another and are both located in the first burst, and wherein said burst further includes a delta time value for a future burst corresponding to said program;
said processor further configured to deactivate said reception circuitry after said first burst is received;
a memory storing said delta time value for a subsequent reception of said future burst corresponding to said program; and
wherein said processor is configured to use said redundant encoded data for said first segment to provide said first segment of said program for the user if a previous burst comprising primary encoded data of said first segment of said program is erroneously received.

18. The method of claim 1, further comprising storing the primary and redundant data as separate tracks in a base media file.

19. The method of claim 1, further comprising generating different redundant data streams for different media components of the program.

20. The method of claim 10, further comprising displaying to a user an identification of the number of redundant streams available for the program.

21. A computer-readable medium, storing computer-executable instructions that, when executed, cause an apparatus to perform the following:
receiving first and second sequential segments of a program for transmission, wherein said first segment occurs before said second segment in said program;
encoding said first and second segments with a first encoder to form primary encoded data for each of said segments;
encoding said first and second segments with a second encoder to form redundant encoded data for each of said segments, said second encoder applying a different encoding process than the first encoder;
transmitting said primary encoded data of said second sequential segment and said redundant encoded data of said first sequential segment in a single time slice burst.

22. The computer-readable medium of claim 21, wherein said primary encoded data for said second sequential segment and said redundant encoded data for said first sequential segment are separated in time by additional data within said burst.

23. A computer-readable medium storing computer-executable instructions that, when executed, cause an apparatus to perform the following:
receiving a first transmission burst, said first burst comprising:
primary encoded data for a second segment of a multimedia program encoded with a first encoder;
redundant encoded data for a first segment of the multimedia program encoded with a second encoder, and;
a first delta time value for a future transmission burst corresponding to said multimedia program, wherein said second segment is later in said program than said first segment, and said primary and redundant encoded data are both in the first transmission burst.

24. The computer-readable medium of claim 23, wherein a time period of said periodic bursts of data equals a duration of said first segment of said program.

25. The method of claim 1, wherein in the transmitting, the primary and redundant encoded data are transmitted at opposite ends of the time slice burst.

* * * * *